July 4, 1939.　　J. S. FRECHETTE　　2,165,096
SERIAL MULTIWAY VALVE
Filed March 16, 1937　　3 Sheets-Sheet 2
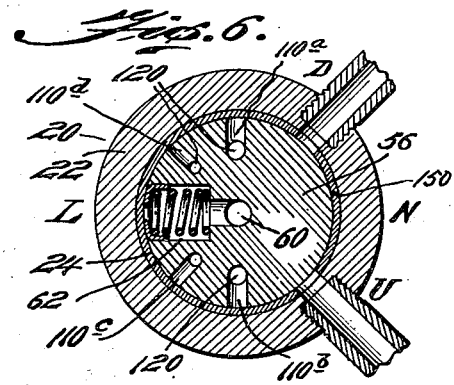
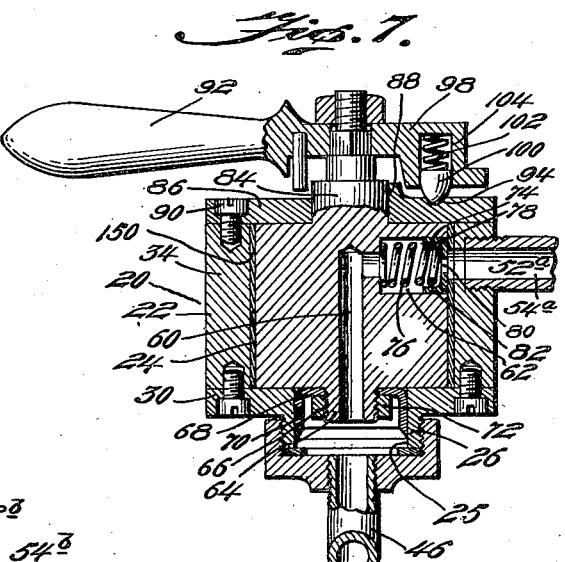
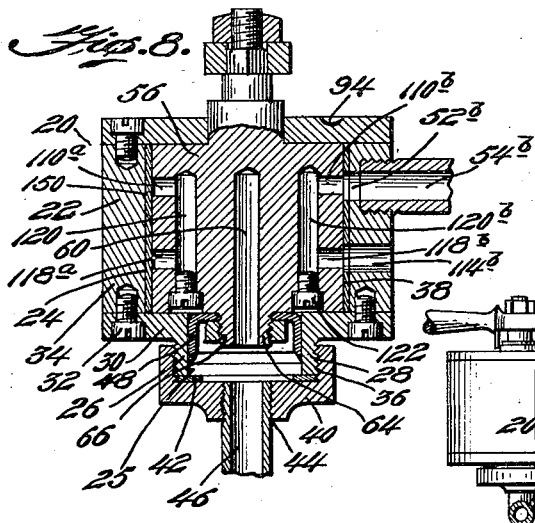
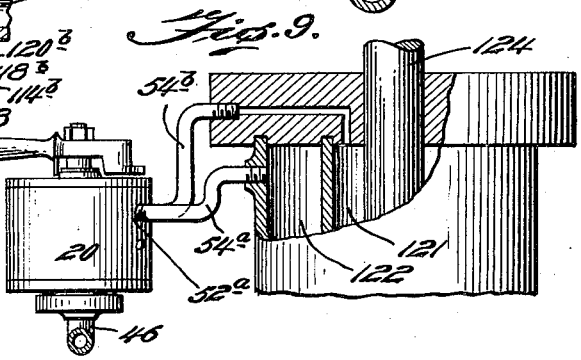
Inventor
John S. Frechette
By Thomas A. Jenckes
Attorney July 4, 1939.  J. S. FRECHETTE  2,165,096
SERIAL MULTIWAY VALVE
Filed March 16, 1937   3 Sheets-Sheet 3
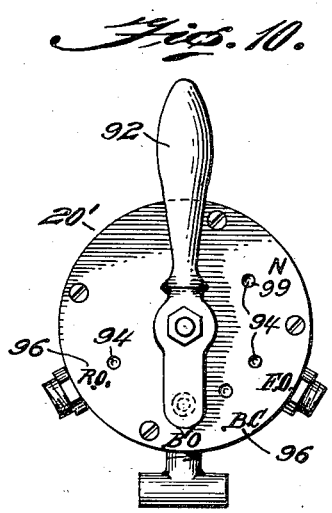
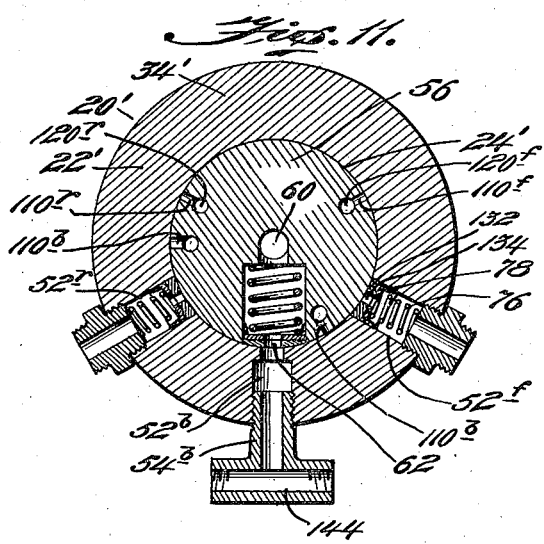
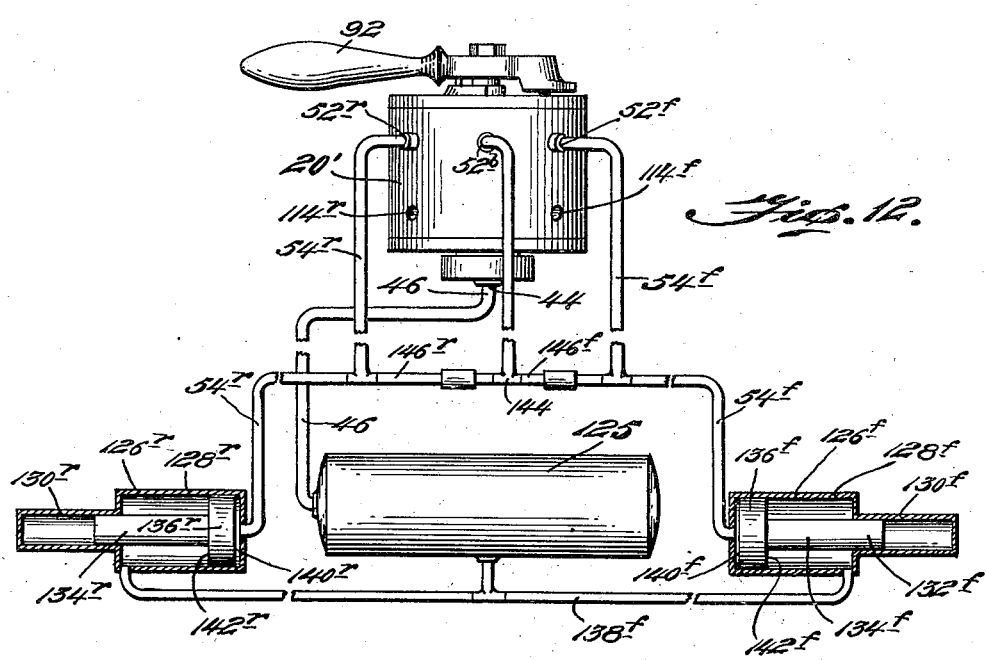
Inventor
John S. Frechette
By Thomas A. Jenckes
Attorney Patented July 4, 1939

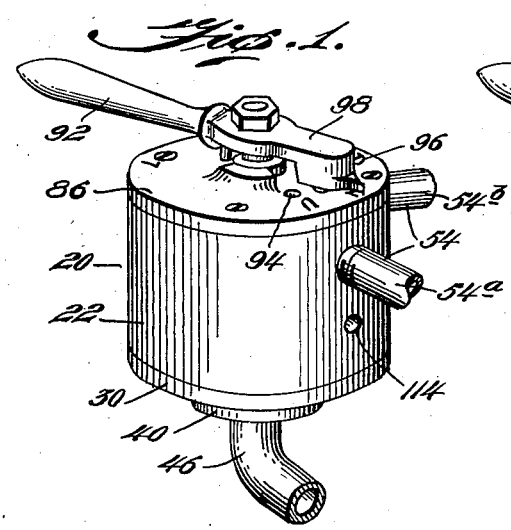
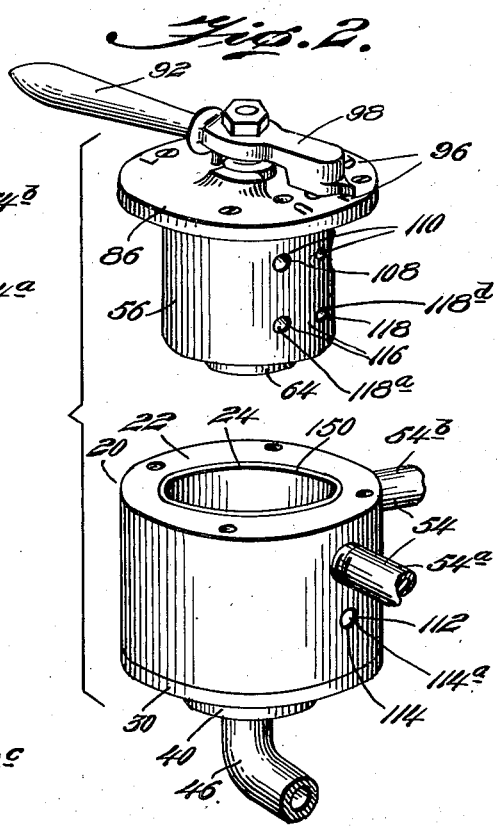
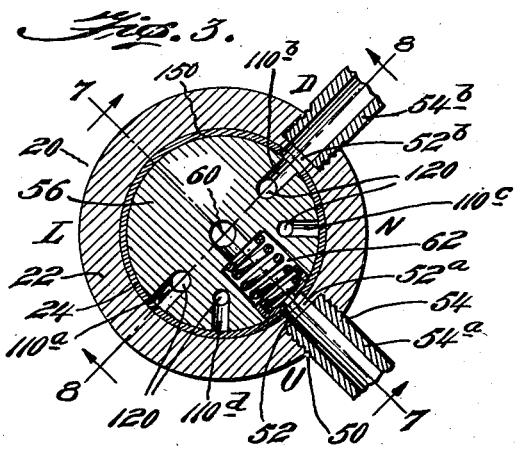
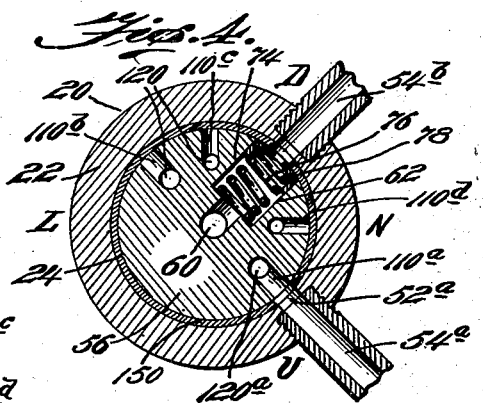
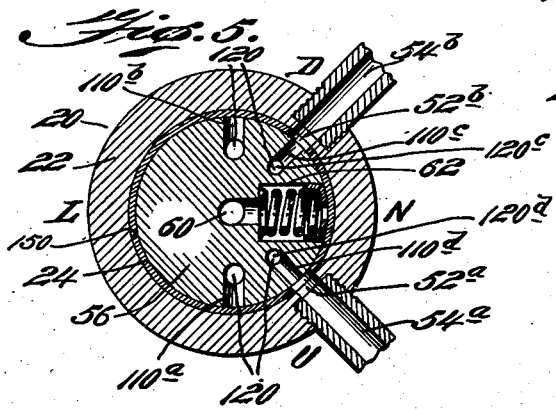

2,165,096

UNITED STATES PATENT OFFICE 2,165,096

SERIAL MULTIWAY VALVE

John S. Frechette, Providence, R. I.

Application March 16, 1937, Serial No. 131,205

3 Claims. (Cl. 251—104)

My invention relates to improvements in serial multiway valves.

An object of my invention is to provide a simple compact multi-way valve unit complete in itself and constructed of a small number of unitary parts, each of which is relatively easy and inexpensive to manufacture and which may be readily assembled and disassembled, if desired, or may readily have its flow functions changed by the mere boring of different holes in the rotor portion thereof, and/or by making changes of holes in the stator portion thereof. I provide therefore a valve structure which may be made in its various parts as a standard unit permitting the manufacture of a large number of such units for stock and the cutting of the necessary holes therein suitable for the specific use of the valve on order and if desired permitting reconstruction of the valve by plugging up certain holes and making other holes on order permitting the use of the same valve for a different purpose.

Further features of my invention relate to the means I preferably employ therein to seal the valve against leakage at all points.

A further feature of my invention is to provide a serial multi-way valve of relatively low maintenance cost and as a feature in this respect I preferably employ a lining between the valve and its valve seat, which may be readily replaced after wear between the valve and valve seat to permit the use of the valve longer inasmuch as whatever wear may take place between the valve and valve seat may be taken up by the lining and compensated for by the replacement of the lining.

A further feature of my improved valve is to provide a structure which may be readily adapted to a wide variety of uses or different conditions, such as pneumatics or hydraulics, permitting reversibility of flow functions if desired. As stated an additional feature of my invention is that the valve structure may be readily adapted for different uses by selectively and variably spacing the flow holes in the stator and rotor to accomplish different purposes. Among the uses, as shown in the accompanying drawings, one is in connection with my improved power plant or portable automotive truck jack, as shown and described in my copending application for patent for Hydraulic pneumatic power plant particularly for use with portable jacks, Serial No. 99,256, filed September 3, 1936, and another for which my improved valve is particularly adapted is in a hydraulic mechanism of the type now employed for opening and closing vehicular doors by means of hydraulic or pneumatic pressure and it is apparent that my improved valve may be readily constructed to open a front set of doors and a rear set of doors selectively or collectively and similarly close them. It is also apparent that by merely selecting the number of and spacings between said holes, any number of positions of the valve, such as a complete shutoff, a neutral or leakage position or varying positive flow positions thereof may be readily provided.

These and such other objects of my invention as may hereinafter appear will be best understood from a description of the accompanying drawings, which illustrate two different embodiments thereof, one of a type adapted for use in a hydraulic pneumatic automotive jack and the other of a type adapted for use in an automotive bus door opening and closing mechanism.

Fig. 1 is a perspective view of an embodiment of my invention particularly adapted for use in controlling the air flow for raising and lowering the hydraulic pneumatic jack, the subject matter of my aforementioned application with the valve so constructed as to be capable of being moved to four positions, namely, (1) a jack raising position, (2) a jack positively lowering position, (3) a neutral gravity leakage position and (4) a complete shutoff position.

Fig. 2 is a disassembled perspective view of the embodiment of my invention shown in Fig. 1.

Figs. 3–6 are horizontal sectional views of the embodiment of my invention shown in Figs. 1 and 2, showing the rotor and stator relatively rotated to perform the four above mentioned flow functions, Fig. 3 showing the parts thereof in a position to raise the jack, Fig. 4 showing the parts thereof in a position to positively lower the jack, Fig. 5 showing the parts thereof in a position permitting leakage and hence gravity lowering of the jack and Fig. 6 illustrating the parts thereof in a positive shut-off position.

Fig. 7 is a vertical sectional view through my improved multi-way valve taken along the line 7—7 of Fig. 3.

Fig. 8 is a vertical sectional view through my valve taken along the line 8—8 of Fig. 3.

Fig. 9 is a diagrammatic side elevation illustrating my jack mounted adjacent the top portion of the hydraulic reservoir and cylinder of my aforedescribed improved automotive jack, portions of said cylinder and reservoir being shown in section.

Fig. 10 is a plan view of a valve constructed in accordance with my invention and provided with the suitable spacings of a suitable number of holes to provide suitable selective flow passages from a source of pneumatic power to (1) simultaneously open both front and rear sets of doors on an automotive bus, (2) to selectively open the front doors and simultaneously close the rear doors, (3) to selectively close the rear doors and to simultaneously open the front doors and (4) to provide a positive non-flow or shut-off position.

Fig. 11 is a cross sectional view generally similar to Figs. 3-6 of the embodiment of my invention shown in Fig. 10 with the rotor and stator thereof moved to a position to effect a positive opening of both sets of front and rear doors.

Fig. 12 is a diagrammatic side elevation showing the improved type of valve shown in Figs. 10 and 11 attached to a standard pneumatic system now in use for selectively opening and closing front and rear sets of doors on automotive buses.

In the drawings, wherein like characters of reference indicate like parts throughout, 20 generally indicates an improved serial multi-way valve constructed in accordance with my invention. Said valve comprises a hollow stator 22, having a cylindrical valve seat bore 24 therein provided, if desired, with a smaller bore 25 at the lower end thereof. This smaller bore may be provided by providing a boss 26 projecting downwardly substantially centrally thereof externally threaded as at 28 for a purpose to be described.

If desired the base of the stator may comprise a plate 30 detachably securable by means of the screws 32 to the lower end of the side wall 34 of the stator, said base plate 30 having the boss 26 projecting downwardly therefrom, said base plate being provided with the bore 25 therein of relatively smaller diameter than the stator bore 24. As shown in the drawings, I preferably provide the cap 40 having the internally threaded bore 36 for threading on the externally threaded boss 26 provided with an annular washer 42 constructed of leather, fibre or other composition material to provide a seal for the lower end of the boss 26 against the upper inner surface of said cap body. The cap 40 preferably has the central hole 44 for threaded reception of an inlet pipe 46 therein. Said boss 26 is adapted to receive the seal 48 later to be described adapted to rotate therein.

The stator side wall 34 is provided with a tier 50 of radial holes 52 therein, preferably adapted to have pipes 54 secured in the outer ends thereof, such as by threading them in the outer ends of said holes as shown and it is apparent that said pipes 54 are adapted to perform different flow functions.

I also provide a cylindrical valve rotor member 56 comprising a solid, preferably metallic cylinder rotatably mounted within said cylindrical stator bore 24. Said rotor 56 is preferably provided with a hole 60 projecting vertically upwardly from the lower end thereof and a hole 62 projecting radially outwardly from the upper end of said vertical hole 60, said radial hole 62 adapted to be horizontally aligned with said tier 50 of holes 52 in the stator.

It is believed that the stator so far described is novel from a structural point of view in serial multi-way valves.

If desired a seal may be provided for the lower end of the rotor projecting downwardly within the bore 25 of smaller diameter below the enlarged cylindrical bore 24 of the stator and for this purpose a boss 64 is preferably provided projecting downwardly centrally of said rotor 56 having an externally threaded portion 66 and an annular washer 68 is provided having an inner edge adapted to abut the upper end of said boss 64 to project outwardly substantially the radial distance between the upper end of said boss and the surface of said bore 25 and then downwardly as at 70 along the surface of said bore 25. Said washer 68 may be secured to the lower end of said rotor by means of the threaded nut 72 threaded onto the threaded boss 64 to clamp the inner edge of said washer 68 against the lower surface of the solid cylindrical rotor 56. The washer 68 may be constructed of any suitable flexible resilient material, such as leather or rubber, or fibre impregnated composition but preferably of a resilient material tending to at all times expand to a flat position to cause the downwardly projecting portion or skirt 70 thereof to continuously wipe and seal the inner surface of the bore 25 to positively prevent leakage between the lower end of the rotor and the cap 30 as said washer rotates with the rotor 56, or when stationary.

In order to prevent leakage within the radial hole 62, particularly as it comes into and out of alignment with a tier hole 52 in the stator, said hole 62 may be provided with an enlarged bore 74 near the outer end thereof having a helical spring 76 mounted therein having an inner end adapted to abut the inner end of said enlarged bore and I provide a cushioning washer cap or cup 78, preferably constructed of leather, rubber or other suitable composition material having a perforation or hole 80 therein of substantially the size of the upper tier holes 52 or slightly smaller as shown and a wall 82 extending axially inwardly of said enlarged bore 74, said cap being mounted on the outer end of said spring 76 to be normally urged outwardly against the inner surface of the stator bore to supplementally provide a fluid seal at all times.

I also provide means to rotate said rotor 56 within said stator 22 and in my preferred embodiment, said means includes a turning stem 84 projecting integrally upwardly from said rotor 56. I also provide a removable stator cover 86 having the central hole 88 therein for receiving said stator stem 84 and being detachably secured to the upper end of said stator wall 34 by means of the screws 90. The upper end of said rotor stem is provided with a suitable handle 92 for rotating it, preferably projecting radially beyond said stator 22.

I also provide means for indicating proper relative positions of said rotor and stator to provide a predetermined way-flow through the radial holes of said valve rotor and stator or if desired, a complete shut-off.

In my preferred embodiment the indicating portion of said means is preferably mounted on the stator cover 86 and means are supplementally provided on said stator cover 86 and in association with said handle 92 to provide positive stop means for the proper predetermined relatively adjusted positions of said rotor for desired ways of flow through the valve and in my preferred embodiment for this purpose the stator cover 86 is provided with the stop recesses 94 and suitable indicia 96 are provided on said stator cover at circumferentially spaced points thereof in circumferential alignment. In use, said stop recesses 94 are indicative of predetermined alignments of rotor and stator valve holes 62 and 52 respectively to accomplish a selected predetermined unidirectional flow through said valve and I provide a pointer 98 located at a fixed distance from the handle 92 and rotatable therewith having a downwardly spring urged plug 100 urged downwardly by a spring 102 contained in a suitable bore 104 therefor in said pointer 98, the lower end of said plug being reciprocally mounted in said bore to be spring urged into a selected stop recess 94 to provide a predetermined unidirectional flow through the radial holes of said valve rotor and stator respectively or a complete shut-off.

I believe that the aforedescribed means are also novel in connection with a single inlet hole in the rotor and a plurality of selective holes in the stator.

I have discovered, however, that supplemental holes may be provided in the stator and rotor and if desired a supplemental tier of holes may be provided in the stator and rotor respectively to multiply the range of possible unidirectional flow connections of the valve by simply adding more holes therein at selective variable spacings to accomplish predetermined flow functions. For this purpose I may provide in said rotor a tier 108 of radial holes 110 extending radially a distance within said stator or in fact any desired direction to achieve a plurality of supplemental flow functions, said holes 10 being preferably horizontally aligned with said inlet hole 62, or if desired comprising a plurality of inlet, outlet or exhaust holes.

A feature, I believe to be entirely novel to me is to provide in association with said upper respective tier 52 of holes 54 in the stator and tier 108 of holes 110 in the rotor, said tier 108 also including the special inlet hole 62 if desired, lower tiers of complementary flow holes either exhaust or bypass flow holes, namely, the lower tier 112 of flow holes 114 in the stator and the lower tier 116 of lower radial flow holes 118 in said rotor and in my improved construction, I preferably continue said rotor holes 110 and 118 respectively only a slight distance within said rotor and provide the vertical channels 120 connecting the inner ends of said respective upper and lower tiers 108 and 116 of radial holes 110 and 118 in said rotor respectively. A constructional feature of my improved rotor is that the vertical channels 120 connecting said holes 110 and 118 may be formed in the solid cylindrical rotor 56 by vertically boring upwardly from the lower end of the rotor to provide said vertical holes 120 from the bottom of the rotor upwards and inserting the threaded plugs 122 in the lower ends of said holes 120 to plug them up so that they provide only interconnecting vertical passageways between the inner ends of the respective radial holes 110 and 118. Depending on the desired conditions of flow the number of holes in the various respective tiers may be suitably varied. As stated hitherto, the lower tier 112 of the stator holes 114, the lower tier 116 of rotor holes 118, the upper tier 108 of rotor holes 110 and the vertical interconnecting channels are generally for the purpose of providing exhaust passages or bypass passages adapted to function in association with the main inlet passage 60 and 62 functioning through a selected hole 52 of the upper tier 50 of stator holes as an inlet and if desired the rotor may be so turned as to make any selected hole in the upper tier of rotor holes function through the same selected stator hole 52 as had previously been used as an inlet hole as the portion of an exhaust passage. As there is no exhaust or bypass required when the inlet hole 62 of the rotor is in register with an inlet hole 52 of the stator there will be normally no vertically aligned cooperating or bypass hole at the stator at this point and so no vertically extending passage 120 or vertically aligned rotor hole 118 is provided in the lower tier of the rotor holes 116 immediately below the rotor inlet hole 62 so as to provide a complete shutoff at any selected stator hole 52 temporarily employed as an inlet by having a blank portion of the rotor temporarily opposite the respective exhaust or bypass hole 114 of the lower tier of stator holes immediately below the stator hole 52 then temporarily used as an inlet hole.

As a greater plurality of exhaust or bypass passages may more often be desired to become respectively aligned with cooperating stator holes to function as bypasses or exhaust passes or for other purposes there are normally a larger plurality of holes in the rotor than there are in the stator, as will become apparent from a description of my improved valve with the stator and rotor holes respectively so variably spaced as to function in association with the cylinder 121 and reservoir 122 of my improved jack having the vertically reciprocatable piston 124 carrying the jack-pad within the cylinder 120 thereof as described in said aforementioned application. For this purpose a pipe 54$^a$ connects a hole 52$^a$ to the upper end of the reservoir 122 and a pipe 54$^b$ connects a hole 52$^b$ to the upper end of the cylinder 121.

As is apparent from the sectional views shown in Figs. 3–6 when the handle 92 is rotated to rotate the rotor to the position shown in Fig. 3 it becomes apparent that the inlet hole 62 is opposite the hole 52$^a$ leading to the pipe 54$^a$ connected to the reservoir 122 permitting air to be admitted to the top of the oil in the reservoir 122 forcing oil upwardly as shown in said application within the cylinder 121 causing the piston and piston rod 124 to rise with consequent raising of the jack-pad (see Figs. 3 and 9). From an inspection of Fig. 9 it will be seen that the upper tier rotor hole 110$^b$ is opposite the hole 52$^b$ to which the pipe 54$^b$ is connected and that as the piston rises in said cylinder 121, it will force air outwardly through the pipe 54$^b$, the aligned hole 110$^b$, vertical channel 120$^b$ aligned therewith and out through the lower tier hole 118$^b$ and out through the then aligned lower stator tier hole 114$^b$ exhausting into atmosphere.

As shown in Fig. 4, however, when the rotor 56 is rotated to bring the inlet hole 62 in alignment with the pipe 54$^b$ admitting air to the top of the cylinder 121, it is obvious that air will be exhausted through the pipe 54$^a$, hole 52$^a$ aligned therewith through the then aligned upper rotor tier hole 110$^a$ down its respective vertical channel 120$^a$ and out through the lower respective tier holes 118$^a$ and 114$^a$ discharging into atmosphere to permit a positive lowering of the jack by means of compressed air.

When, however, the rotor is moved to the position shown in Fig. 5, it is obvious that the respective upper rotor tier holes 110$^c$ and 110$^d$ will become aligned with the respective pipe ends 54$^a$ and 54$^b$ and that air will be free to flow either way through the stator holes 52$^a$ and 52$^b$, the rotor holes 110$^c$ and 110$^d$, the respective rotor channels 120$^c$ and 120$^d$, the respective rotor lower tier holes 118$^c$ and 118$^d$ and out through the respective lower stator holes 114$^a$ and 114$^b$, thus in the embodiment shown permitting a gravity lowering of the piston rod 124 within the cylinder 121 with a continuous exhaust passage formed by the respective holes 52$^a$, 110$^d$, 120$^d$, 118ᵈ and 114ᵉ and a continuous air inlet passage formed by the holes 52ᵇ, 110ᶜ, 120ᶜ, 118ᵉ and 114ᵇ permitting the gravity descent.

I have shown in Fig. 6 a positive non-flow stop position with the rotor 56 moved so that all the holes thereof are positively out of alignment with all the stator holes.

I have shown in Figs. 10–18 an embodiment of my valve adapted for use with a pneumatic system normally employed for positively opening and closing the front and rear sets of automotive bus or trolley car doors. Said pneumatic system includes a source of compressed air or other pneumatic supply, such as the tank 125. Power plants 126ᶠ and 126ʳ are provided for opening or closing the front and rear sets of doors. Each of said power plants, namely, the power plant 126ᶠ for the front set of doors, and the power plant 126ʳ for the rear set of doors comprises a cylinder 128ᶠ or 128ʳ having outwardly projecting extensions 130ᶠ or 130ʳ of smaller diameter. Said extension 130ᶠ is adapted to contain at all times the end 132ᶠ of a piston rod 134ᶠ having at its inner end the enlarged piston 136ᶠ of the approximate diameter of the cylinder 128ᶠ. An inlet pipe 46 connects the source of supply to the inlet hole 44 of the valve stator and hence hole 60 of the valve rotor in the manner explained. A pipe 54ᶠ connects the respective stator upper tier hole 52ᶠ to the inner end of the cylinder 128ᶠ and a pipe 138ᶠ connects the outer end of the cylinder 128ᶠ to the source of compressed air or tank 125.

The pneumatic device shown operates as follows: when the valve rotor 56 is moved to bring the radial inlet rotor hole 62 in alignment with the hole 52ᶠ, the compressed air from the source of supply 125 flows through the pipe 46 out through the rotor inlet hole 62 through the connected pipe 52ᶠ and is discharged at the inner end of the cylinder 128ᶠ. At all times the pipe 138ᶠ discharges compressed air from the tank 125 at the outer end of the cylinder 128ᶠ. When the rotor valve hole 62 is brought into alignment with the hole 52ᶠ, it is obvious that compressed air will be admitted to the cylinder 128ᶠ on both sides of the piston head 136ᶠ and as the volume of the inner side 140ᶠ of the said piston is greater than the volume of the outer side 142ᶠ of said piston which equals the volume of the inner side minus the volume of the piston rod 134ᶠ and thus presents only an annular surface area of less extent than the solid circular area 140ᶠ, it is obvious that due to differences in said areas the greater volume of compressed air functioning against the piston surface 140ᶠ of greater area will urge the piston 136ᶠ outwardly to positively open the set of front doors.

When, however, the rotor valve 56 is rotated to bring the hole 62 out of alignment with the hole 52ᶠ and a cooperating discharge passage is provided by proper alignments of the hole 110ᶠ with the stator hole 52ᶠ, thus providing a continuous exhaust passage through the hole 110ᶠ, the vertical channel 120ᶠ, the rotor hole 118ᶠ and the lower stator hole 114ᶠ, it is obvious that the compressed air functioning against the annular surface 142ᶠ of the piston 136ᶠ of smaller area will force the piston to the left permitting air to be discharged through the aligned passages formed by the pipe 54ᶠ, hole 52ᶠ, hole 110ᶠ, channel 120ᶠ, hole 118ᶠ and exhausted out through the stator hole 114ᶠ to atmosphere to close the front set of doors. It is apparent that when the hole 110ᶠ is brought into alignment with the hole 52ᶠ in the particular embodiment shown, that there will be a complete reversibility of flow, for the inlet hole 62 will be brought into alignment with the upper tier stator hole 52ʳ causing the rear set of doors to simultaneously open. This reversibility of flow is optional as it merely saves supplemental valve positions and cooperating sets of holes. The embodiment shown is so constructed that when the radial inlet hole 62 is brought into alignment with the upper tier hole 52ᵇ, a T-fitting is provided on the end of the pipe connection 54ᵇ thereof as shown at 144 provided with pipes 146ᶠ and 146ʳ connected respectively to the pipes 54ᶠ and 54ʳ causing a supply of air to be simultaneously admitted to the inner ends of the cylinders 128ᶠ and 128ʳ simultaneously to positively force the respective pistons 134ᶠ and 134ʳ outwardly in the manner explained to positively open both sets of doors at once. The vertically aligned set holes 110ᶠ and 110ʳ, channels 120ᶠ and 120ʳ, and holes 118ᶠ and 118ʳ are also provided spaced sufficiently so that the valve rotor may be moved to a position to bring both sets of holes 110ᶠ and 110ʳ, etc. into alignment with the respective holes 52ᶠ and 52ʳ and it is obvious that when in this position the inlet hole 62 will be against a solid portion of the cylinder wall 34 so that the compressed air flowing from the source of supply 125 through the pipes 138ᶠ and 138ʳ to the outer ends of the respective cylinders 128ᶠ and 128ʳ will function against the annular piston surfaces 142ᶠ and 142ʳ of smaller area to urge the pistons 136ᶠ and 136ʳ to close both sets of doors at once, air exhausting from the inner ends of said cylinders 128ᶠ and 128ʳ simultaneously through the pipes 54ᶠ and 54ʳ and the exhaust passages to atmosphere formed by the aligned holes 52ᶠ and 52ʳ, 110ᶠ and 110ʳ, channels 120ᶠ and 120ʳ, holes 118ᶠ and 118ʳ and holes 114ᶠ and 114ʳ respectively.

I have shown in the plan view shown in Fig. 10 the insignia 96 and stop recesses 94 for accomplishing these different functions, a stop recess 99 for neutral position being shown with everything possible shut off and all rotor holes against solid portions of the stator wall to achieve a positive stop or shut off position.

In the embodiment shown in Fig. 11, I have provided a type of seal of the exact construction functioning in the reverse direction to that in the enlarged bore 74 of the stator inlet hole 62 in the suitably enlarged stator holes 52ᶠ and 52ʳ with the exception that the washers 78 are normally urged inwardly by the springs 76 abutting the pipe ends 54ᶠ and 54ʳ and the inner ends of the respective holes 52ᶠ and 52ʳ are provided with metal plugs 132 centrally perforated as at 134 with holes substantially the size of the radial rotor holes 110 to prevent leakage on the back flow of air from the respective cylinders 128ᶠ and 128ʳ.

It is thus seen that my improved valve may be readily adapted to different uses for any desired plurality of unidirectional flow conditions by providing composite sets of holes therefor by merely changing the number and variation in spacings of the sets of holes of the respective upper and lower stator and rotor tiers. It is also readily apparent that the valves may be constructed in quantity and after an order has been received holes may then be suitably bored therein for that particular use and it is also apparent that if desired, to change the valve over to a different use, certain holes may then be plugged up and new ones made for the later use.

A further feature of my invention consists in providing a cylindrical lining 150 to be inserted between the outer periphery of the rotor 56 and inner surface of the cylindrical stator bore 25. This preferably comprises a cylindrical steel lining 150 and it is apparent that after the valve has been used for a considerable amount of time and the contacting relatively rotatable surfaces somewhat worn, the play may be taken up by the insertion of a new lining 150, thereby obviating any liability of leakage due to wear of these parts.

It is obvious that I have provided a novel type of valve simple in its construction and readily adaptable by slight changes therein to any selected one or a wide variation of uses involving straight or multi-flow passages.

It is understood that my invention is not limited to the specific embodiments shown and that various deviations may be made therefrom without departing from the spirit and scope of the appended claims.

What I claim is:

1. A serial multi-way valve, comprising a hollow stator having a cylindrical valve seat bore therein adapted to have an inlet connected centrally to the lower end thereof, an upper tier of two circumferentially spaced radial holes adapted to have pipes connected thereto spaced to alternately conjointly function respectively as inlet and outlet holes and a lower complementary tier of exhaust holes immediately below said upper tier holes, a cylindrical valve rotor member rotatable within said cylindrical stator bore having an inlet hole extending vertically within to receive fluid from said stator inlet hole and a hole projecting radially outwardly from the upper end of said vertical inlet hole horizontally aligned with said upper tier inlet and outlet holes having an enlarged bore near the outer end thereof containing a spring outwardly urged cushioning washer having a perforation therein of substantially the size of a respective stator tier hole, said rotor member also having an upper tier of radial holes extending radially a distance within horizontally aligned with said inlet hole and also horizontally aligned with said upper tier of stator holes, a lower tier of exhaust holes extending a similar distance within vertically aligned with said upper tier holes and horizontally aligned with the lower tier of stator holes and vertical bores connecting the inner ends of the holes of the upper and lower tiers, said upper and lower rotor tier holes and connecting bores forming rotor exhaust passages, one each of said exhaust passages being so spaced from said rotor inlet passage on each side thereof as to come into alignment with a set of vertically aligned stator holes to complete an exhaust passage through said valve when the rotor inlet passage is brought adjacent the opposite stator upper tier hole, and two additional of said rotor exhaust passages being spaced from each other amounts equal to the distance between said two sets of stator holes to connect each of said stator upper tier holes to atmosphere to equalize the pressure in each of said holes, and means to rotate said rotor.

2. A serial multi-way valve, comprising a hollow stator having a cylindrical valve seat bore therein adapted to have an inlet connected centrally to the lower end thereof, an upper tier of two circumferentially spaced radial holes adapted to have pipes connected thereto spaced to alternately conjointly function respectively as inlet and outlet holes and a lower complementary tier of exhaust holes immediately below said upper tier holes, a cylindrical valve rotor member rotatable within said cylindrical stator bore having an inlet hole extending vertically within to receive fluid from said stator inlet hole and a hole projecting radially outwardly from the upper end of said vertical inlet hole horizontally aligned with said upper tier inlet and outlet holes having an enlarged bore near the outer end thereof containing a spring outwardly urged cushioning washer having a perforation therein of substantially the size of a respective stator tier hole, said rotor member also having an upper tier of radial holes extending radially a distance within horizontally aligned with said inlet hole and also horizontally aligned with said upper tier of stator holes, a lower tier of exhaust holes extending a similar distance within vertically aligned with said upper tier holes and horizontally aligned with the lower tier of stator holes and vertical bores connecting the inner ends of the holes of the upper and lower tiers, said upper and lower rotor tier holes and connecting bores forming rotor exhaust passages, one each of said exhaust passages being so spaced from said rotor inlet passage on each side thereof as to come into alignment with a set of vertically aligned stator holes to complete an exhaust passage through said valve when the rotor inlet passage is brought adjacent the opposite stator upper tier hole, and two additional of said rotor exhaust passages being spaced from each other amounts equal to the distance between said two sets of stator holes to connect each of said stator upper tier holes to atmosphere to equalize the pressure in each of said holes and means to rotate said rotor, each of said stator upper tier holes having an enlarged bore of lesser diameter than that of said enlarged radial rotor inlet hole bore near the inner end thereof containing a spring of less strength than that in said radial rotor inlet hole having a cushioning washer on the inner end thereof having a perforation therein of substantially the size of a respective stator tier exhaust hole.

3. A serial multi-way valve comprising a hollow stator having a cylindrical valve seat bore therein adapted to have an inlet connected centrally to the lower end thereof, an upper tier of two circumferentially spaced radial holes adapted to have pipes connected thereto spaced to alternately conjointly function respectively as inlet and outlet holes and a lower complementary tier of exhaust holes immediately below said upper tier holes, a cylindrical valve rotor member rotatable within said cylindrical stator bore having an inlet hole extending vertically within to receive fluid from said stator inlet hole and a hole projecting radially outwardly from the upper end of said vertical inlet hole horizontally aligned with said upper tier inlet holes having an enlarged bore near the outer end thereof containing a spring outwardly urged cushioning washer having a perforation therein of substantially the size of a respective stator tier hole, said rotor member also having an upper tier of radial holes extending radially a distance within horizontally aligned with said inlet hole and also horizontally aligned with said upper tier of stator holes, a lower tier of exhaust holes extending a similar distance within vertically aligned with said upper tier holes and horizontally aligned with the lower tier of stator holes and vertical bores connecting the inner ends of the holes of the upper and lower tiers, said upper and lower rotor tier holes and connecting bores forming rotor exhaust passages, one each of said exhaust passages being so spaced from said rotor inlet passage on each side thereof as to come into alignment with a set of vertically aligned stator holes to complete an exhaust passage through said valve when the rotor inlet passage is brought adjacent the opposite stator upper tier hole, and means to rotate said rotor, each of said stator upper tier holes having an enlarged bore of lesser diameter than that of said enlarged radial rotor inlet hole bore near the inner end thereof containing a spring of less strength than that in said radial rotor inlet hole having a cushioning washer on the inner end thereof having a perforation therein of substantially the size of a respective stator tier exhaust hole.

JOHN S. FRECHETTE.